United States Patent
Vu et al.

(10) Patent No.: US 9,941,548 B2
(45) Date of Patent: Apr. 10, 2018

(54) NICKEL IRON BATTERY

(71) Applicant: Landmark Battery Innovations, Inc., Austin, TX (US)

(72) Inventors: Viet Vu, Canton, MI (US); Ajoy Datta, Fullerton, CA (US); Lucien Paul Fontaine, Lincoln, RI (US); Andrew James Parth, Ypsilanti, MI (US)

(73) Assignee: Landmark Battery Innovations, Inc., Austin, TX (US)

( * ) Notice: Subject to any disclaimer, the term of this patent is extended or adjusted under 35 U.S.C. 154(b) by 112 days.

(21) Appl. No.: 14/308,441

(22) Filed: Jun. 18, 2014

(65) Prior Publication Data

US 2014/0377626 A1 Dec. 25, 2014

Related U.S. Application Data

(60) Provisional application No. 61/837,209, filed on Jun. 20, 2013.

(51) Int. Cl.
*H01M 10/30* (2006.01)
*H01M 2/06* (2006.01)
*H01M 2/24* (2006.01)
*H01M 4/70* (2006.01)
*H01M 10/04* (2006.01)
(Continued)

(52) U.S. Cl.
CPC .......... *H01M 10/30* (2013.01); *H01M 2/206* (2013.01); *H01M 2/24* (2013.01); *H01M 4/248* (2013.01); *H01M 4/70* (2013.01); *H01M 10/0413* (2013.01); *H01M 10/0468* (2013.01);
(Continued)

(58) Field of Classification Search
CPC ........ H01M 10/30; H01M 4/72–4/747; H01M 4/76–4/762
See application file for complete search history.

(56) References Cited

U.S. PATENT DOCUMENTS 797,845 A 8/1905 Edison
831,269 A 9/1906 Edison
(Continued)

FOREIGN PATENT DOCUMENTS

| CN | 201345381 Y | 11/2009 |
|---|---|---|
| EP | 1742279 B1 | 7/1996 |
| RU | 2064208 C1 | 1/2007 |

OTHER PUBLICATIONS

David Linden and Thomas B. Reddy; Handbook of Batteries, Chapter 25—Iron Electrode Batteries, copyright 2002, pp. 25.1-25.26, McGraw-Hill, published in USA.
(Continued)

*Primary Examiner* — Jonathan Crepeau
*Assistant Examiner* — Jacob Buchanan
(74) *Attorney, Agent, or Firm* — The Noblitt Group, PLLC

(57) ABSTRACT

A Nickel iron battery using a mono-block housing that has cells with leak-proof intercell connections. The intercell connections use compressed grommets to prevent fluid transfer between the cells. Each cell generates a charge that can be connected in series or parallel as required. The cells use an electrode plate that enables a manufacturing process which yields higher efficiency, higher throughput, and significantly lower battery cost. The anode composition of the cells has iron powder to increase cathode utilization, therefore lowering cathode material usage and lowering production cost.

17 Claims, 21 Drawing Sheets

(51) Int. Cl.
*H01M 2/20* (2006.01)
*H01M 4/24* (2006.01)

(52) U.S. Cl.
CPC ........ *H01M 2220/20* (2013.01); *Y02E 60/124* (2013.01); *Y02P 70/54* (2015.11)

(56) References Cited

U.S. PATENT DOCUMENTS

| | | | | |
|---|---|---|---|---|
| 3,313,658 A * | 4/1967 | Sabatino | ................ | H01M 2/24 429/160 |
| 3,525,640 A | 8/1970 | McCormick et al. | | |
| 3,615,831 A * | 10/1971 | Ruben | ................ | H01M 4/14 429/204 |
| 3,849,198 A * | 11/1974 | Seidel | ................ | H01M 4/248 429/221 |
| 3,853,624 A * | 12/1974 | Brown | ................ | H01M 4/0459 429/221 |
| 4,306,004 A * | 12/1981 | Kaun | ................ | H01M 2/1613 264/104 |
| 4,363,857 A * | 12/1982 | Mix | ................ | H01M 4/72 29/623.1 |
| 4,480,018 A * | 10/1984 | de Bellis | ................ | H01M 2/24 429/160 |
| 4,749,635 A * | 6/1988 | Muller | ................ | H01M 4/02 429/234 |
| 5,681,673 A * | 10/1997 | Hattori | ................ | H01M 4/667 429/223 |
| 5,709,965 A * | 1/1998 | Grivel | ................ | H01M 2/22 429/158 |
| 6,232,007 B1 * | 5/2001 | Payne | ................ | H01M 2/14 29/623.1 |
| 6,605,388 B1 * | 8/2003 | Goda | ................ | H01M 4/70 29/2 |
| 7,547,487 B1 * | 6/2009 | Smith | ................ | H01M 2/0242 429/100 |
| 2003/0059674 A1 * | 3/2003 | Mann | ................ | H01M 4/14 429/128 |
| 2003/0143466 A1 * | 7/2003 | Goda | ................ | B21D 31/046 429/241 |
| 2012/0058387 A1 | 3/2012 | Ahn | | |
| 2012/0187918 A1 * | 7/2012 | Narayan | ................ | H01M 4/521 320/137 |

OTHER PUBLICATIONS

PCT-US2014043211, International Search Report and Written Opinion and Applicant's Response, all pages (1-14), dated Nov. 6, 2014, search and opinion performed by ROSPATENT.

\* cited by examiner

NICKEL IRON BATTERY

CROSS-REFERENCE TO RELATED APPLICATIONS

This application claims the priority benefit of U.S. Provisional Utility Application 61/837,209 filed Jun. 20, 2013, which is herein incorporated by reference in its entirety.

TECHNICAL FIELD

This disclosure is related to batteries. More particularly, the disclosure discusses a Nickel Iron mono-block battery.

BACKGROUND

The statements in this section merely provide background information related to the present disclosure. Accordingly, such statements are not intended to constitute an admission of prior art.

Nickel Iron batteries are robust, tolerant of abuse, and safe for large scale applications. They are known for having very long calendar and cycle life in comparison to other batteries. Nickel Iron batteries perform well in cyclic applications as the main backup power source for renewable energy and traction power for forklift and locomotive propulsion because of the exceptional tolerance to electrical abuse in higher voltage multiple cell usage against deep discharge and overcharge in comparison to any other battery chemistries.

BRIEF SUMMARY OF THE INVENTION

In one embodiment, the nickel iron battery of the present disclosure comprises: a housing, wherein the housing has partitions that divide the housing into one or more cells, wherein the cell(s) are connected using intercell connections, further wherein each cell comprises: a plurality of positive electrode plates, wherein each positive electrode plate is comprised of a multi-cavity current collector which encases multiple positive electrode pellets and a positive current collector tab; a plurality of negative electrode plates, wherein each negative electrode plate is comprised of a multi-cavity current collector which encases multiple negative electrode pellets and a negative current collector tab; a separator disposed between the positive electrode plates and the negative electrode plates; and a plurality of bands configured to contain the cell in a unified assembly; and an electrolyte disposed in said housing.

The housing can hold the other battery elements as cited above. The housing material of construction can be plastic, plastic coated metal, or any other material compatible with an alkaline electrolyte.

The intercell connections can have a material of construction that is electrically conductive such as steel, nickel, nickel plated steel or the like. The intercell connections can have a fastening method that uses metal crimping, a rivet, nut and bolt, weld, or the like.

The positive electrode plates can have a material of construction that is nickel plated steel or the like. They can contain the one or more pellets.

The multi-cavity current collectors can have a material of construction that is electrically conductive such as steel, nickel, nickel plated steel or the like.

The positive electrode pellets can have a material of construction that is nickel hydroxide, manganese oxides, or the like.

The positive current collector can have a material of construction that is nickel, nickel plated steel, or the like.

The negative electrode pellets can have a material of construction that is Iron Oxide or the like.

The negative current collector can have a material of construction that is nickel, nickel plated steel, or the like.

The separator can have a material of construction that is woven or non-woven nylon, polypropylene, or any other material compatible with an alkaline electrolyte.

The bands can have a material of construction such as polypropylene plastic or the like.

The electrolyte can be a solution containing potassium hydroxide, sodium hydroxide, lithium hydroxide, or the like.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Despite numerous performance advantages over other battery technologies, Nickel Iron batteries have very complex plate manufacturing processes and therefore very high cost to produce.

The present disclosure describes a novel and non-obvious nickel iron battery which has overcome the manufacturing limitations described above, while utilizing the cited advantages. The disclosed invention for Nickel Iron battery has improvements over the current state of the art in three distinct areas. These are: 1) a high voltage Nickel Iron mono-block design comprising a leak-proof inter-cell connection; 2) an electrode plate design approach and manufacturing process to yield higher efficiency, higher throughput, and significantly lower battery cost; and 3) an anode composition which has iron powder to increase cathode utilization and therefore lower cathode material usage and lower production costs.

A current state of the art nickel iron battery comprises: a cathode; an anode; a separator; an electrolyte; and a housing.

Figure 1:
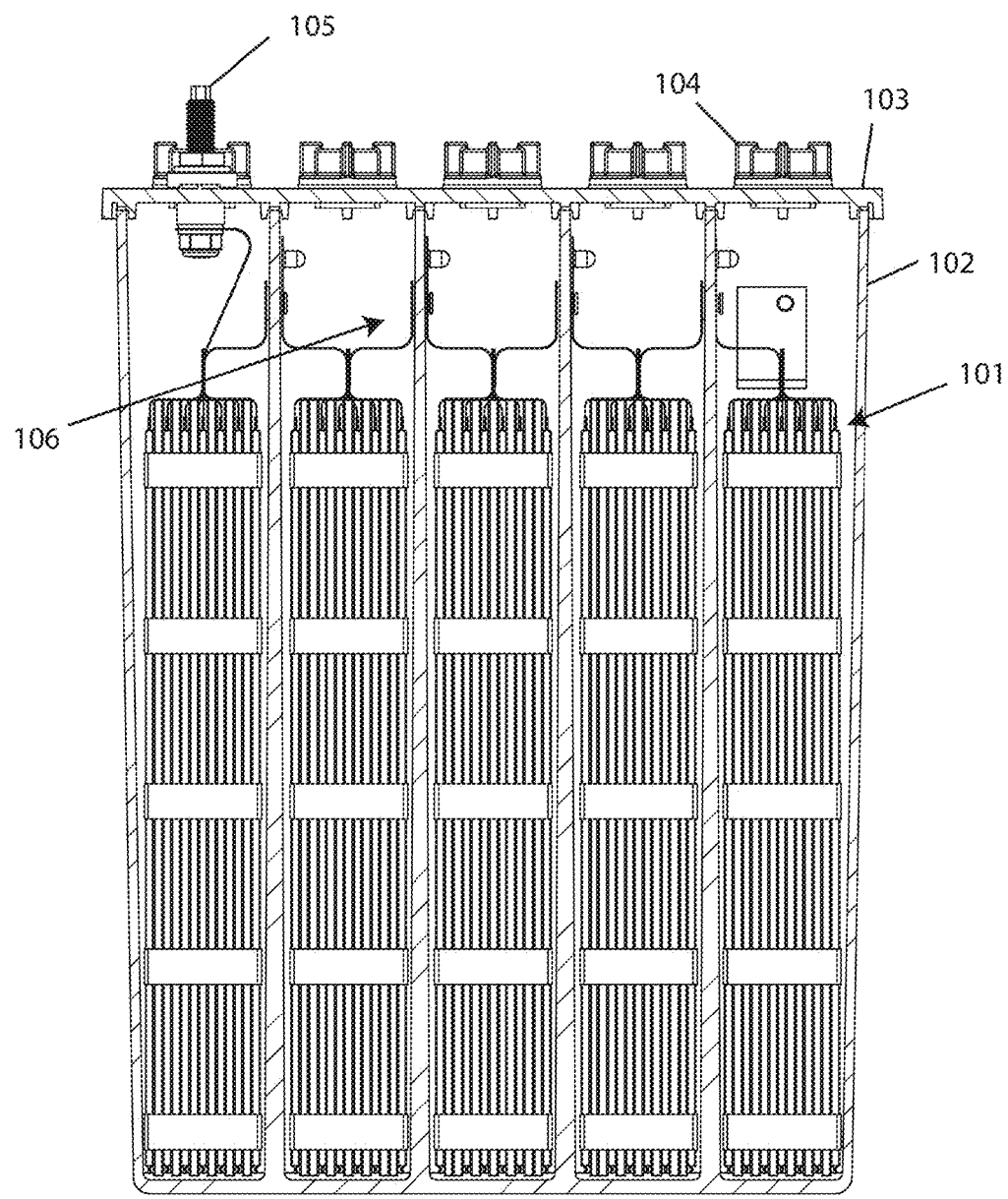
FIG. 1 is a cross-section view of a mono-block Nickel Iron battery housing design with internal inter-cell connections.

The present disclosure provides a mono-block housing design with internal inter-cell connections for the Nickel Iron battery as shown in FIG. 1. The mono-block design comprises leak-proof inter-cell connections within the battery.

In the mono-block design battery voltage can be scaled from 1V to 6V to 12V to 48V or even higher as needed for the power requirement. The advantages of mono-block Nickel Iron include higher battery energy density, lower material usage, and therefore lower manufacturing cost as shown in TABLE 1 below.

TABLE 1

|  | State of the Art 12 V 150 Ah Nickel Iron Battery | The present invention 12 V 150 Ah Nickel Iron battery |
| --- | --- | --- |
| Battery Voltage V | 12 V | 12 V |
| Battery Capacity Ah | 150 Ah | 150 Ah |
| Battery Length cm | 53 cm | 19.2 cm |
| Battery Width cm | 83 cm | 23 cm |
| Battery Height cm | 34.5 cm | 36 cm |
| Battery Weight kg | 90 kg | 34 kg |
| Battery Volume | 150 Liter | 16 Liter |
| Specific Energy Wh/kg | 20 Wh/kg | 53 Wh/kg |
| Energy density Wh/L | 12 Wh/L | 112 Wh/L |
| Projected cost | >400$/kWh | <100$/kWh |

Figure 2A:
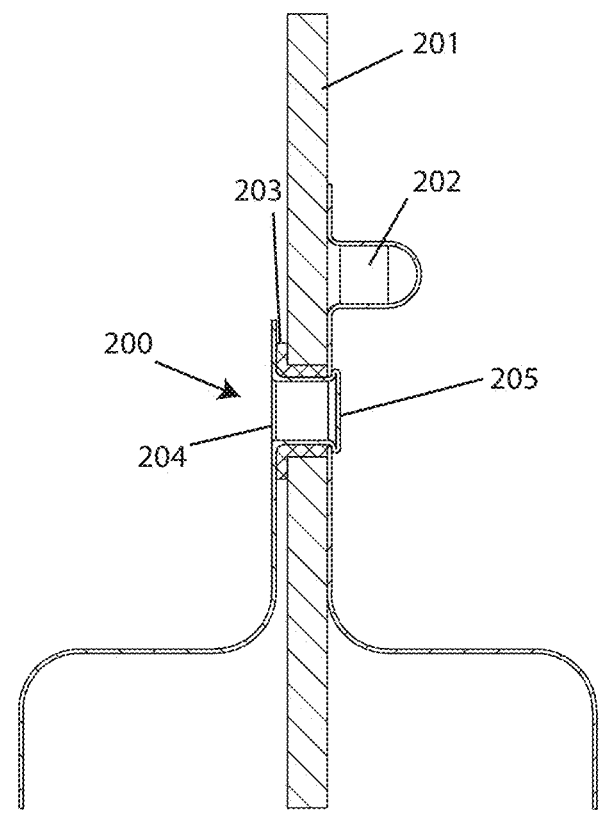
FIG. 2A shows a cross-section view of a crimped intercell connection.
Figure 2B:
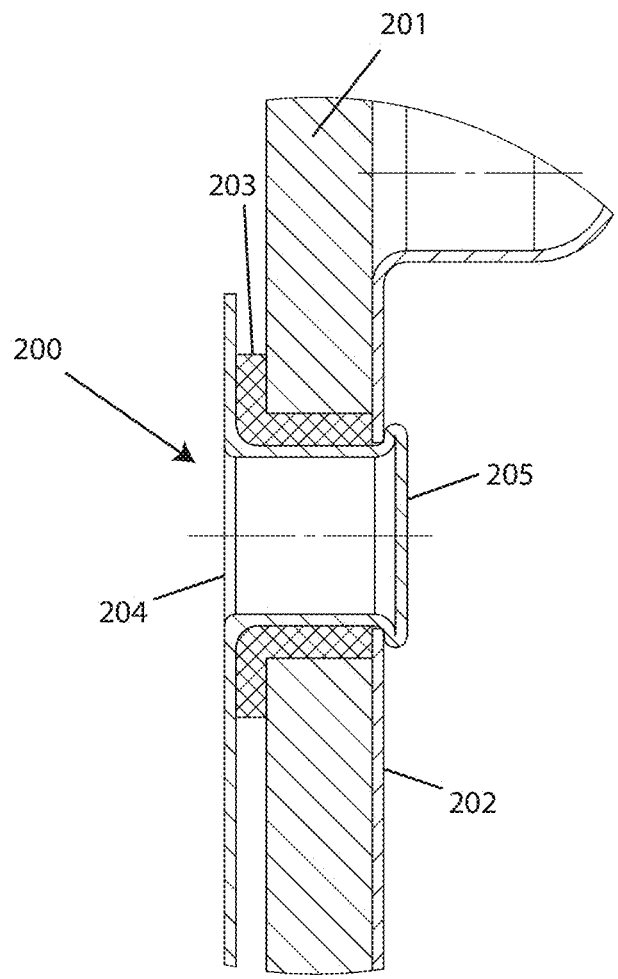
FIG. 2B shows a magnified cross-section view of a crimped intercell connection.
Figure 2C:
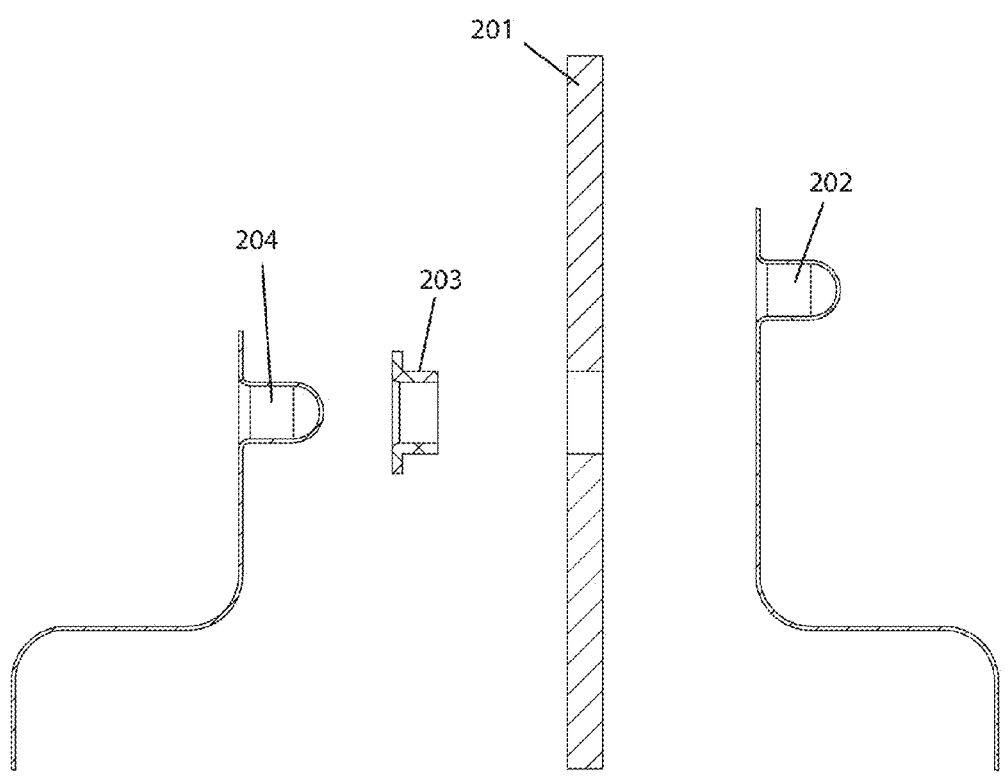
FIG. 2C shows an exploded cross-section view of a crimped intercell connection.

A reliable mono-block Nickel Iron battery requires leak-proof inter-cell connections. Alkaline electrolyte has tendency to creep along conductive metal surfaces. The present mono-block design invention discloses a leak-proof inter-cell connection as shown in FIGS. 2A, 2B, and 2C.

This present disclosure provides a low cost, permanently leak proof connection between cells in a mono-block battery. This is achieved through the compression of a plastic grommet between the positive tab and the negative tab, causing the grommet to conform to the volume of the hole in the intercell partition. The capturing and compression of the grommet material within the intercell partition hole provides a hydrostatic pressure in the grommet which permanently seals the pass through of liquid electrolyte (i.e. does not allow liquid through the partition hole). This design also provides for a long term leak proof connection due to the full capture of the grommet not allowing for long term plastic creep that would reduce the hydrostatic pressure on the grommet and the loss of sealing between the grommet and the positive tab protrusion and/or the intercell partition.

The positive tab has a formed protrusion that has a cylindrical portion enclosed by a spherically radial portion, wherein an outside diameter of the cylindrical portion is between 2 and 30 mm and the length of said cylindrical portion is between 100 and 300% of a thickness of the intercell partition. Upon crimping, the spherical portion is flattened to provide a "head" similar to a rivet head. The "head" provides support on the anode tab holding the assembly in the compressed state. The diameter of the head is between 105 and 200% of the cylindrical portion outside diameter. The material of the positive tab in this embodiment is cold rolled steel with nickel plating. Alternate materials which could be used include stainless steel and nickel or any other materials compatible with the chemistry of interest.

The grommet in this embodiment has a flange but, could be made without the flange and still provide the same sealing characteristics. The material in this embodiment is PTFE. Alternate materials would include Polypropylene, Polyethylene, Polyamide or other polymers that are suitable for the application.

The negative tab has a hole sized to accept the positive tab formed protrusion and retain the "head" of the formed positive tab protrusion. In this embodiment the negative tab has a cylindrical portion enclosed by a spherically radial portion. This feature is used in the assembly process to aid in the orientation of the negative tab. Alternate embodiments may eliminate this feature or change the type of feature.

This present disclosure provides a leak-proof permanently sealed intercell connection by using the positive and negative tabs themselves. No additional sealing post is required for simpler assembly at the lowest possible cost.

Prior art designs for nickel iron pocket plate battery carry very high manufacturing costs due to a complex manufacturing process for the making of electrode plates. In the prior art of the pocket plate making process individual strips of steel are formed, punched, or perforated and then linked together into an electrode plate. This is a complex and costly process to manufacture the plates.

Figure 3:
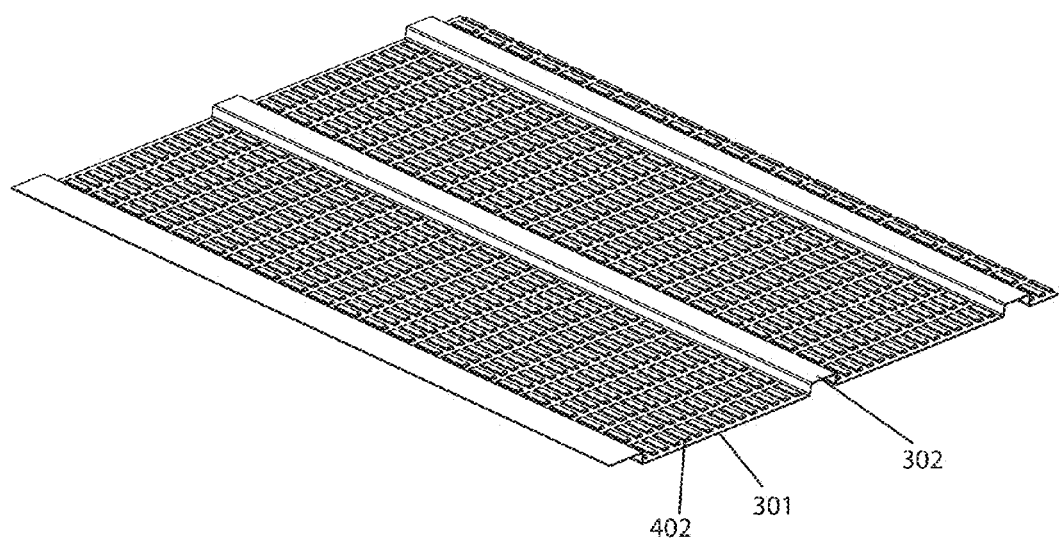
FIG. 3 shows an electrode plate with perforated and unperforated areas.

In contrast, the Nickel Iron battery of the present disclosure provides a high efficiency and high throughput plate manufacturing process by forming the complete electrode plate with specified shapes and dimensions and electrode pockets in a single component. As shown in FIG. 3, this battery makes use of a steel sheet conforming to the size of the electrode plate. Perforation and pockets can be done by hydraulic or mechanical presses on multiple sheets. Both sheet forming and the perforation operations with specified shapes and dimensions can be done at the same time. An alternative approach can make use of already perforated sheet(s) with equivalent results. Already perforated steel sheet(s) may include expanded metal made by expanded metal sheer press or rotary forming die. Although FIG. 3 depicts unperforated sections 302 between perforated sections 301 comprised of electrode pockets 402, an alternate embodiment having a continuous perforation pattern is also acceptable.

The electrode plate is comprised of a plurality of electrode pellets and perforated steel sheets as current collectors. Two (2) individual perforated steel plate components with a plurality of electrode pockets 402 and electrode pellets 404 shown in FIG. 4A and FIG. 4B can provide a robust plate making process with high efficiency, high through-put, and very cost effective assembly. The structure can be joined together by several manufacturing methods including clinching, resistance welding, or the like. Current collector side rails 405 and a current collector tab 403 are added as the final step. The current collectors 401, current collector side rails 405, and current collector tab 403 are joined together in this embodiment by resistance welding. In another embodiment, the joining processes can also be achieved by a mechanical clinching process.

The assembly of both positive and negative electrode plates is similar with the exception of electrode pellet chemical makeup and perforations in the current collector material. In the embodiment shown in FIG. 4A, FIG. 4B, and FIG. 4C, the plurality of electrode pellets 404 are contained in the electrode pockets 402 formed in the current collectors 401.

In one embodiment, the perforation opening dimensions for the cathode plate current collector are 40 to 60 microns tall by 0.30 to 0.50 mm wide, but the acceptable range for these dimensions is 20 to 200 microns tall by 0.10 to 4.00 mm wide.

In one embodiment, the open area percentage, defined as the total included area of the openings per cavity face divided by the surface area of the major face of the cathode pellet, is to be between 5 to 7%, but the acceptable range is 2 to 20%.

In one embodiment, the perforation opening dimensions for the anode plate current collector are 120 to 150 microns tall by 1.00 to 2.00 mms wide, but the acceptable range for these dimensions is 20 to 200 microns tall by 0.10 to 4.00 mm wide.

In one embodiment, the open area percentage, defined as the total included area of the openings per cavity face divided by the surface area of the major face of the anode pellet, is to be between 5 to 7%, but the acceptable range is 2 to 20%.

Figure 6:
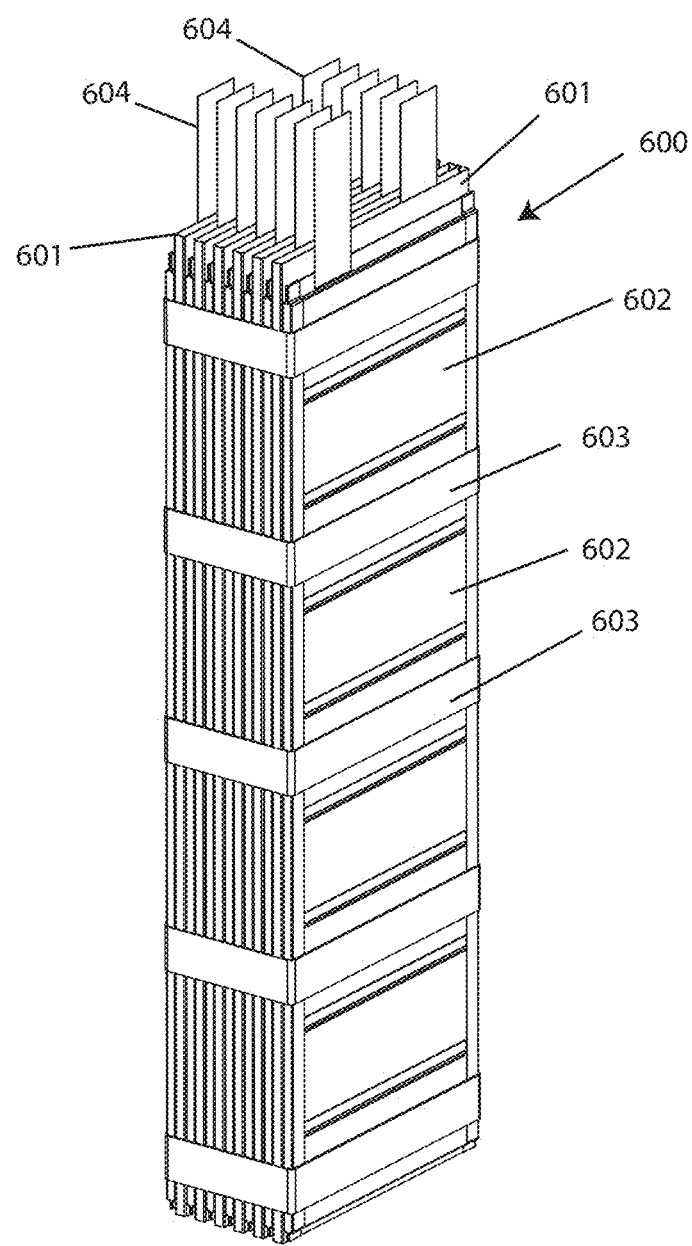
FIG. 6 shows a perspective view of a cell stack.
Figure 7A:
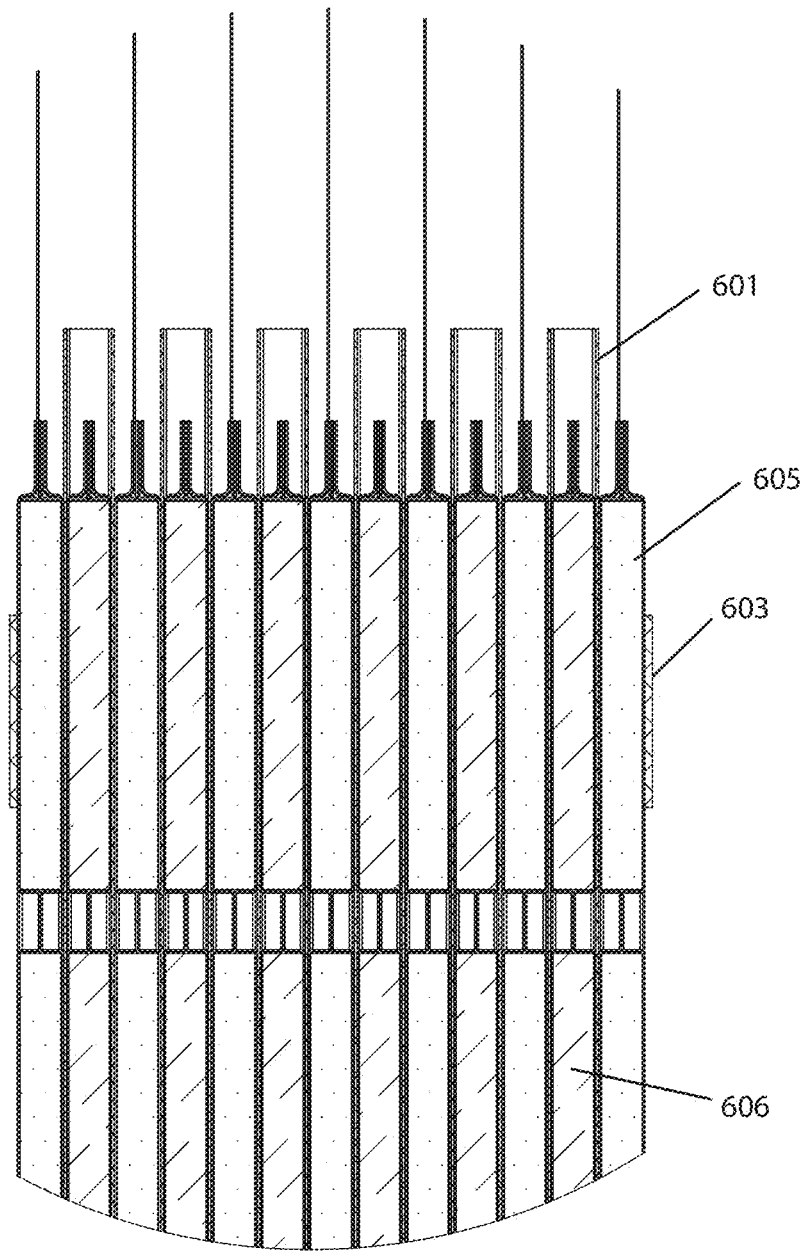
FIG. 7A shows a cross-section view of a cell stack.
Figure 7B:
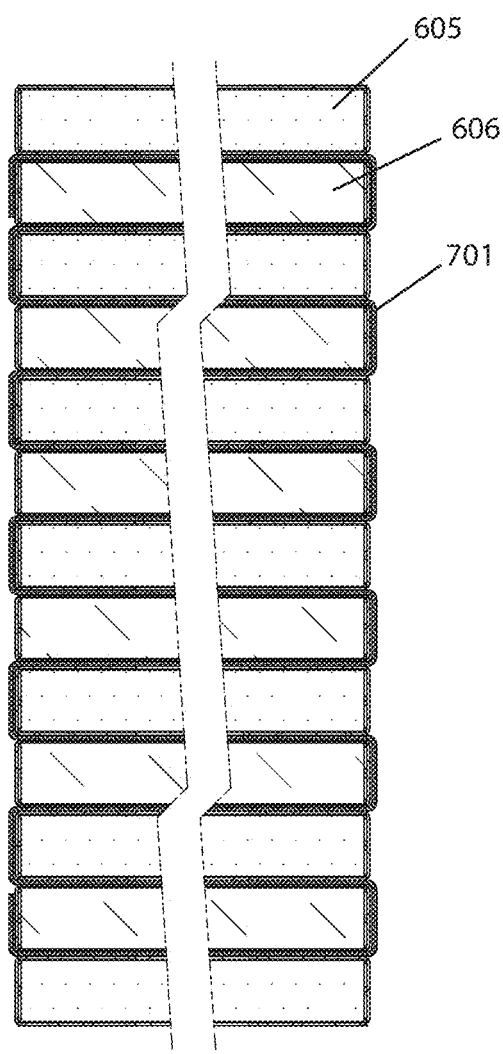
FIG. 7B shows a cross-section-view of a z-fold separator.

The cell stack 600 is comprised of a plurality of electrode plates 602, separator 601, conductive tabs 604, and compressive bands 603. In this embodiment, it is arranged with separator 601 material interwoven between the positive electrode plates 606 and negative electrode plates 605. For this embodiment, FIGS. 6, 7A, and 7B show the separator material to be made of non-woven spun-bonded nylon material, but alternate materials such as polypropylene, polyethylene, and any other materials compatible with the chemistry of interest could be used.

Figure 8:
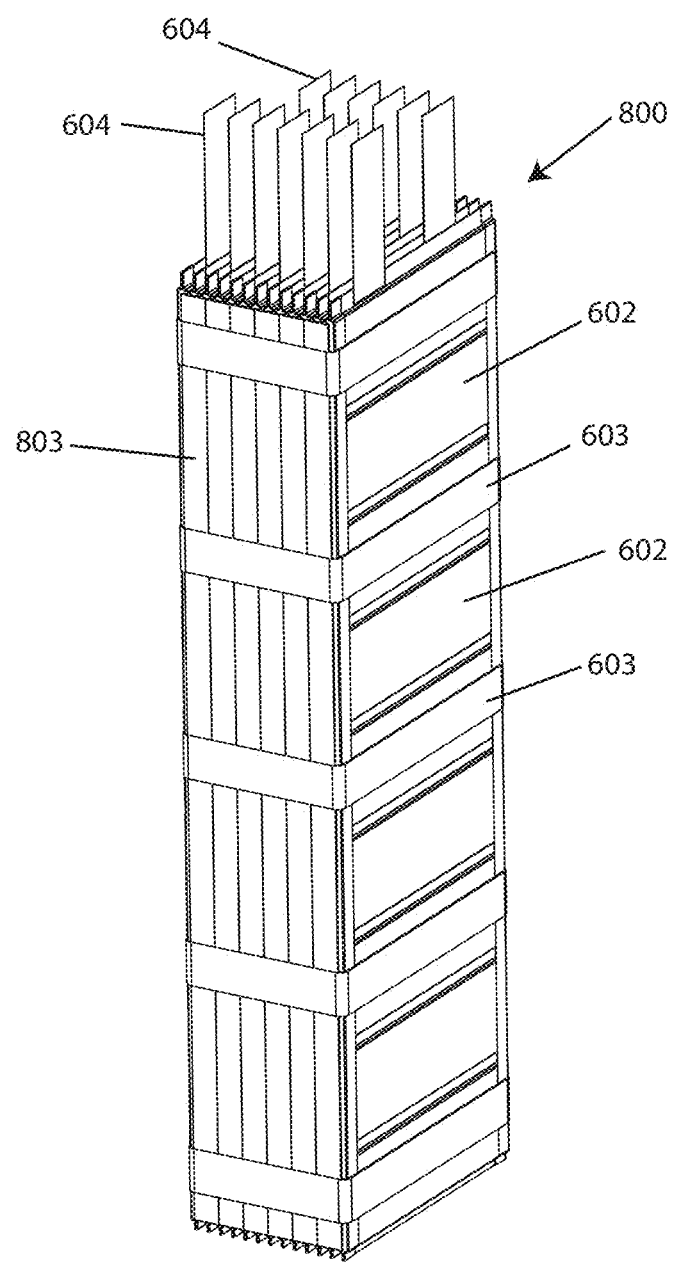
FIG. 8 shows an alternate cell stack embodiment.
Figure 9A:
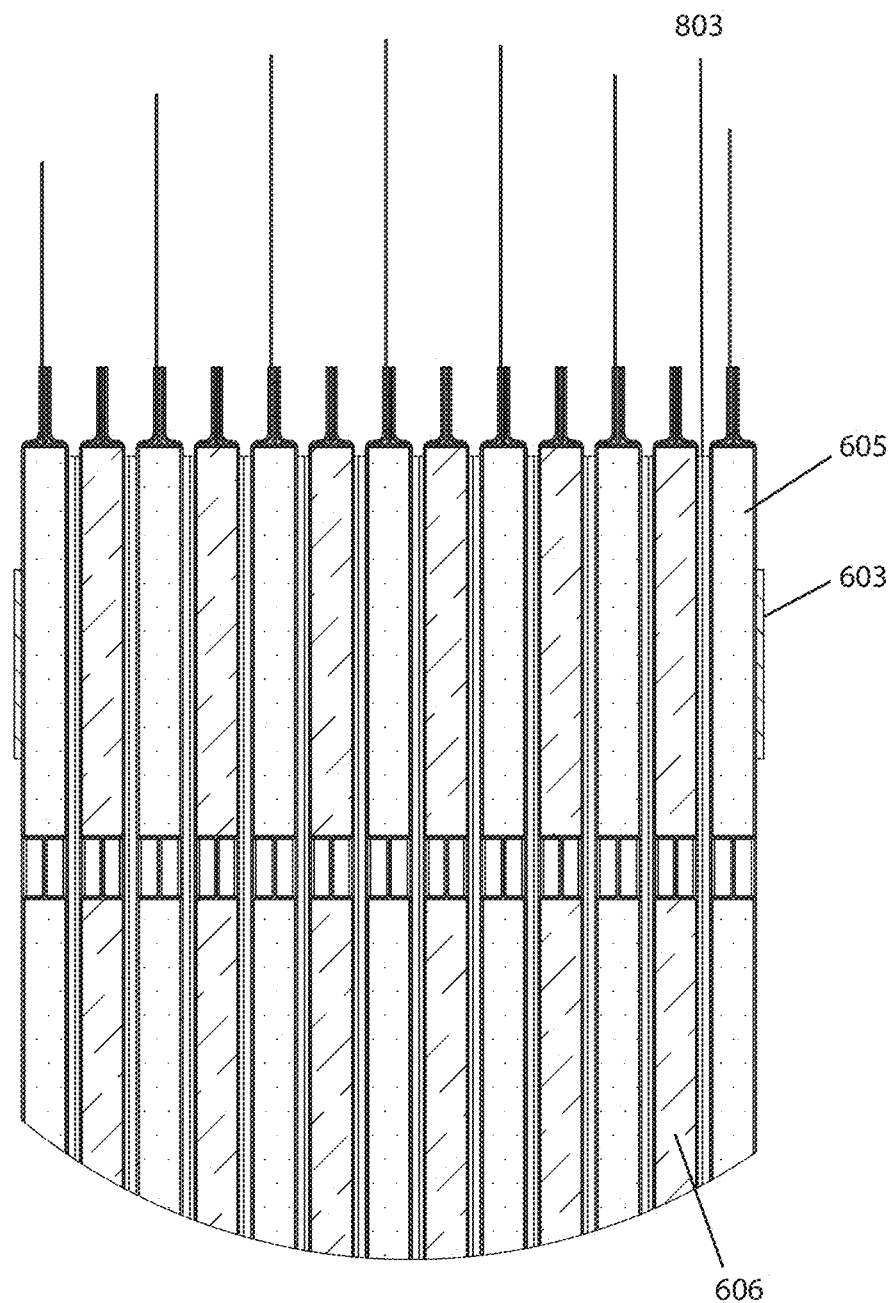
FIG. 9A shows a cross-section view of an alternate cell stack embodiment.
Figure 9B:
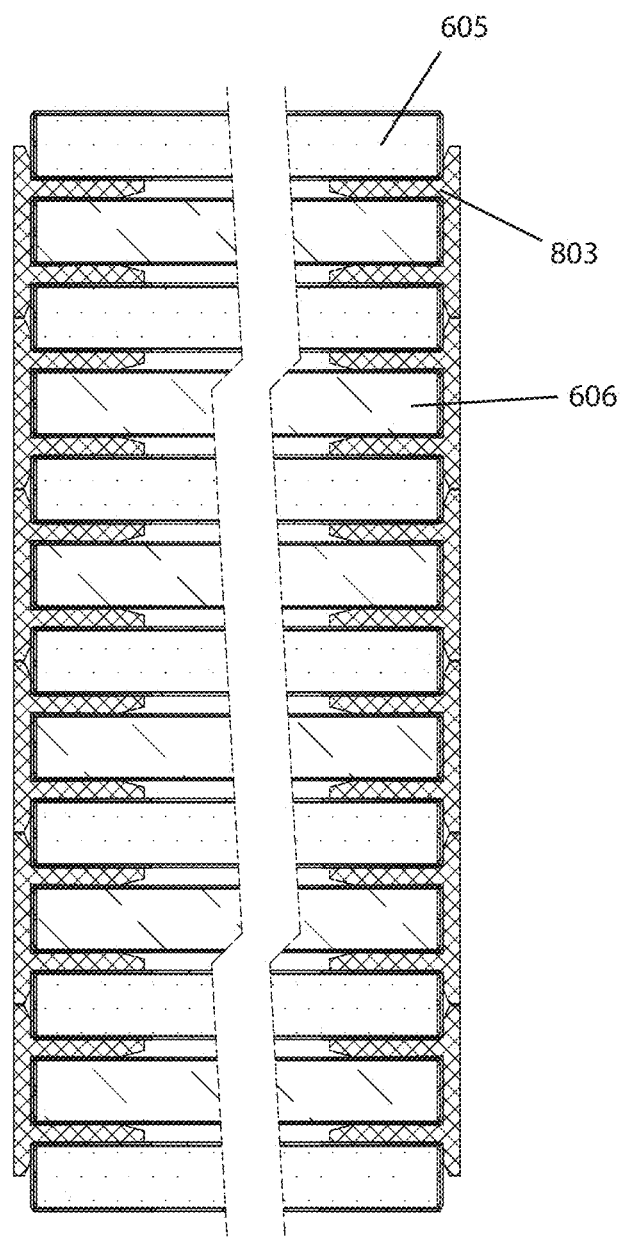
FIG. 9B shows a cross-section-view of an alternate z-fold separator embodiment.

Alternate cell stack embodiment 800 FIGS. 8, 9A, and 9B show the use of a polymer frame 803 without the use of the separator material to provide the needed insulation between the electrode plates 602 while allowing the needed electrolyte into the void space between the electrode plates 602. The material in the alternate embodiment is polypropylene, but alternate materials such as polyamide, polyethylene, and any other materials compatible with the chemistry of interest could be used. In addition, a plurality of bands 603 is used to constrain the alternate cell stack embodiment 800 by providing compression to the alternate cell stack embodiment 800 that is necessary for effective electrical and ionic conductivity. In this embodiment 800, the bands 603 are made from polypropylene, but alternate materials such as rubber, polyethylene, and any other materials compatible with the chemistry of interest could be used.

In one embodiment, the cell stack is comprised of 13 electrode plates with 7 negative electrode plates and 6 positive electrode plates. The total number of electrode plates is dependent upon the intended amp hour capacity of the cell. Alternate embodiments may have any number of electrode plates, depending upon the required capacity of the cell.

The discharge efficiency of the iron anode is not as good as the discharge efficiency of the nickel cathode. The faradic utilization of iron oxide anode is about 30% of theoretical number where as the faradic utilization of nickel hydroxide cathode is about 100%. During first formation cycle a significant amount of expensive nickel hydroxide is wasted because the battery discharge capacity is limited by the iron oxide anode. FIG. 10 depicts the cathode discharge depth without and with the added iron powder. Cell reversible capacity is higher with added iron powder.

The preferred amount of iron powder used in the iron oxide anode is between 5% and 35%. But more preferably it is between 10% and 20%. The preferred embodiment of the iron oxide anode with iron powder may include:

Magnetite Iron oxide powder 50%-87.5%
Sulfur 0.5%-1%
Graphite conductor 5%-10%
Binder 2%-4%
Iron powder 5%-35%

Figure 11:
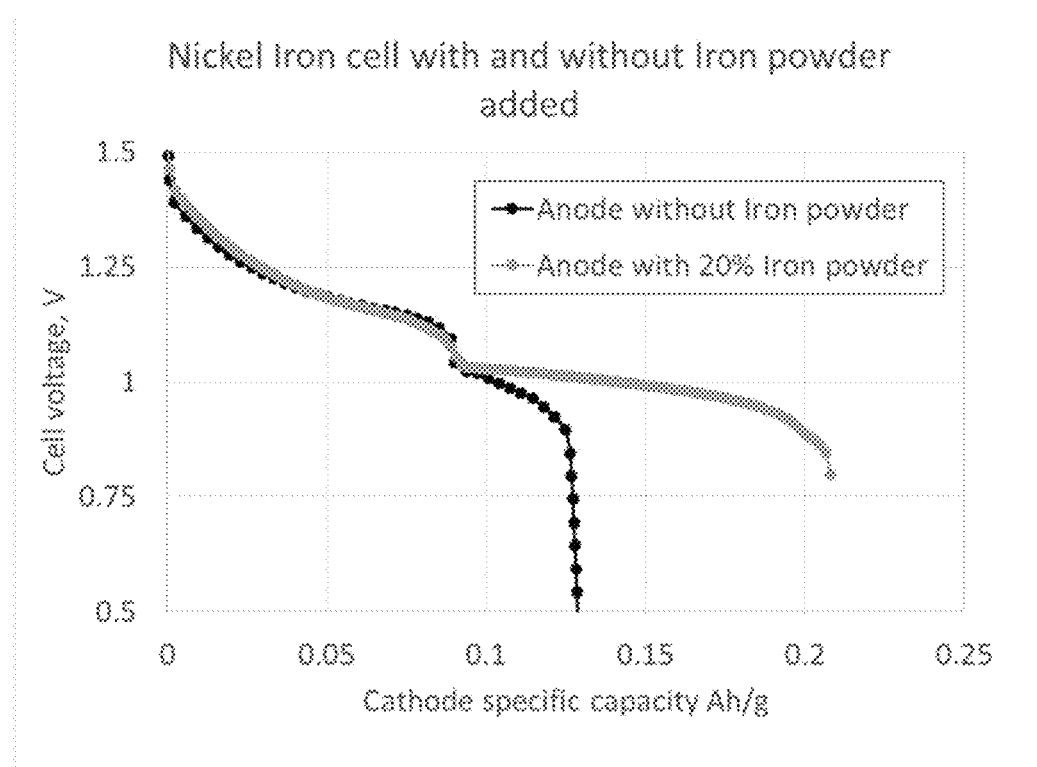
FIG. 11 shows a comparison of nickel iron cell performance both with and without iron powder added.

The iron powder is electrochemically active and therefore can provide the discharge capacity to make up the efficiency loss in the iron oxide anode, so that the cathode capacity can be fully utilized. The preferred particle size of iron powder for good discharge efficiency is 0.5-5 microns, but more preferably between 1-2 microns. With this approach, the battery energy cost is lower with no under-utilized nickel hydroxide. FIG. 11 shows the cell performance with and without the added iron powder. The iron powders in the present disclosure can include atomized iron powder, carbonyl iron powder, iron powder-carbon composite synthesized by reducing iron compound from solution phase onto dispersed carbon powder, or the like. These types of iron powders can be produced with very high purity which can result in lower gassing during charge and therefore higher cycle efficiency.

FIG. 1 is a cross-section view of a mono-block Nickel Iron battery housing design with internal inter-cell connections. Shown are cell stacks 101, battery container 102, battery lid 103, vent caps 104, battery terminal 105, and inter-cell connections 106. The intercell connections 106 are configured to prevent fluid flow between the cell stacks 101.

FIG. 2A shows a cross-section view of a crimped intercell connection 200. Shown are an intercell partition 201, negative tab 202, grommet 203, positive tab 204, and crimped protrusion 205. The grommet 203, is compressed and configured to prevent fluid flow through the crimped intercell connection 200.

FIG. 2B shows a magnified cross-section view of a crimped intercell connection 200. Shown are an intercell partition 201, negative tab 202, grommet 203, positive tab 204, and crimped protrusion 205. The grommet 203, is compressed and configured to prevent fluid flow through the crimped intercell connection 200.

FIG. 2C shows an exploded cross-section view of a crimped intercell connection 200. Shown are an intercell partition 201, negative tab 202, grommet 203, and positive tab 204.

FIG. 3 shows an electrode plate with perforated areas 301 and unperforated areas 302. Also shown are electrode pockets 402 in the perforated areas 301.

Figure 4A:
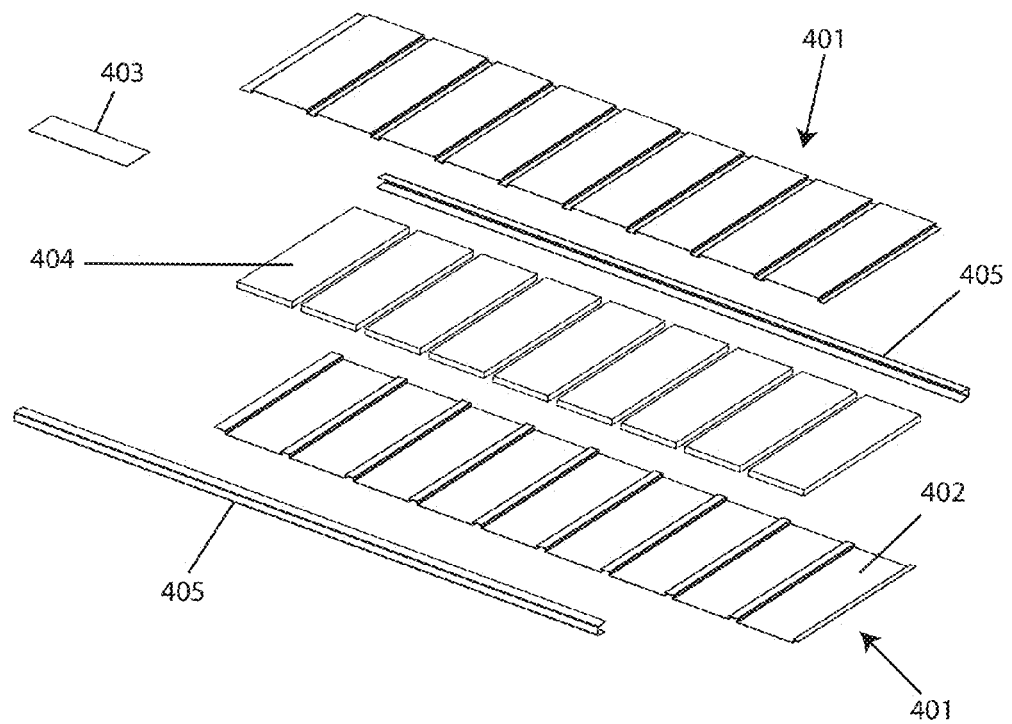
FIG. 4A shows an exploded perspective view of an electrode plate.

FIG. 4A shows an exploded perspective view of an electrode plate. Shown are current collectors 401, electrode pockets 402, current collector tab 403, electrode pellets 404, and current collector side rails 405.

Figure 4B:
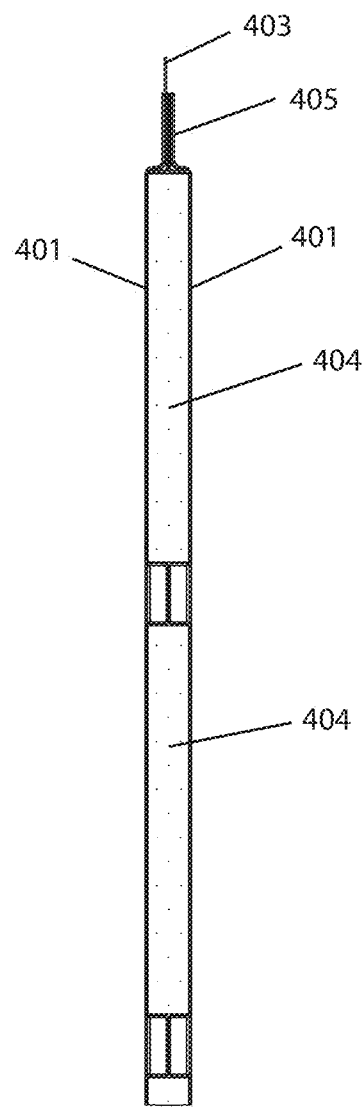
FIG. 4B shows a side cross-section view of an electrode plate.

FIG. 4B shows a side cross-section view of an electrode plate. Shown are current collectors 401, current collector tab 403, electrode pellets 404, and current collector side rail 405.

Figure 4C:
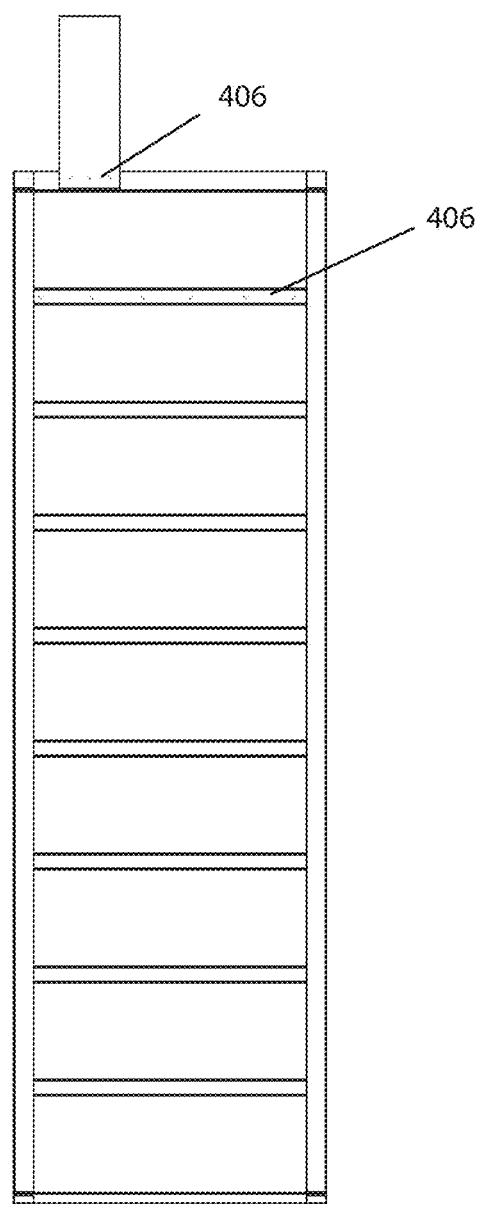
FIG. 4C shows a front view of an electrode plate.

FIG. 4C shows a front view of an electrode plate. Shown are joining locations 406 for the electrode plates. The electrode plates are paired and mirrored so that pockets 402 are formed in-between the joining locations 406. The pockets hold the electrode pellets 404.

Figure 5A:
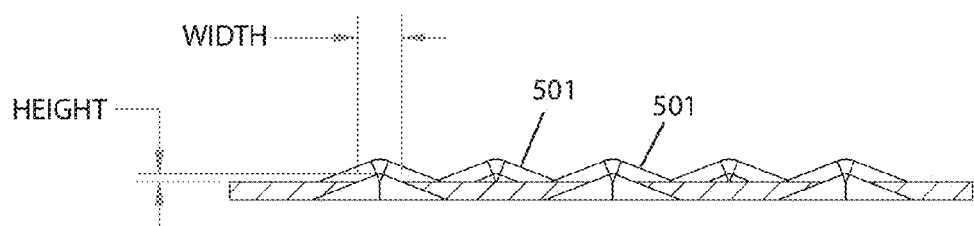
FIG. 5A shows a cross-section view of a perforated steel sheet single-sided louver embodiment.

FIG. 5A shows a cross-section view of a perforated steel sheet single-sided louver embodiment. Shown are single-side louvers 501. The single-sided louvers 501 can have a half-conical shape with a single opening.

Figure 5B:
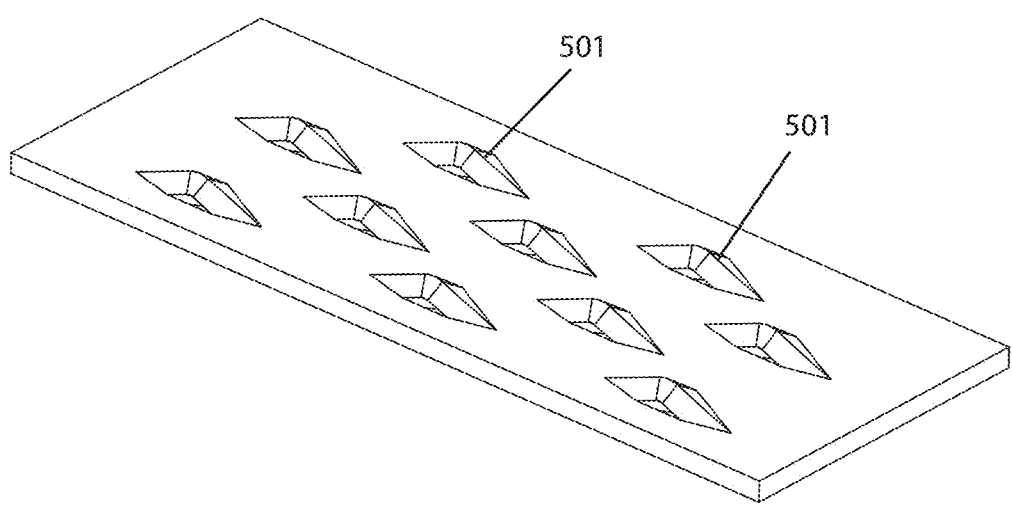
FIG. 5B shows a perspective view of a perforated steel sheet single-sided louver embodiment.

FIG. 5B shows a perspective view of a perforated steel sheet single-sided louver embodiment. Shown are single-side louvers 501. The single-sided louvers 501 can have a half-conical shape with a single opening.

Figure 5C:
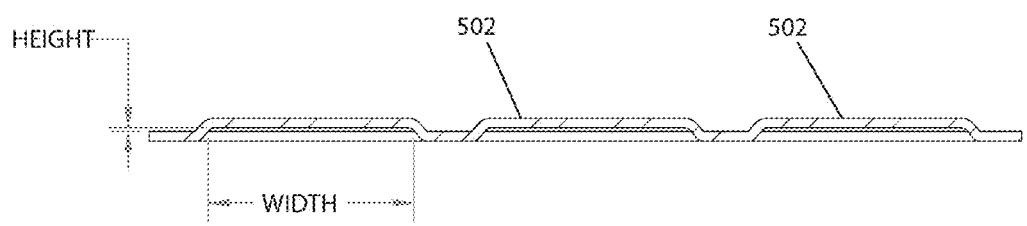
FIG. 5C shows a cross-section view of a perforated steel sheet double-sided louver embodiment.

FIG. 5C shows a cross-section view of a perforated steel sheet double-sided louver embodiment. Shown are double-sided louvers 502. The double-sided louvers 502 can have a trapezoidal shape with two openings.

Figure 5D:
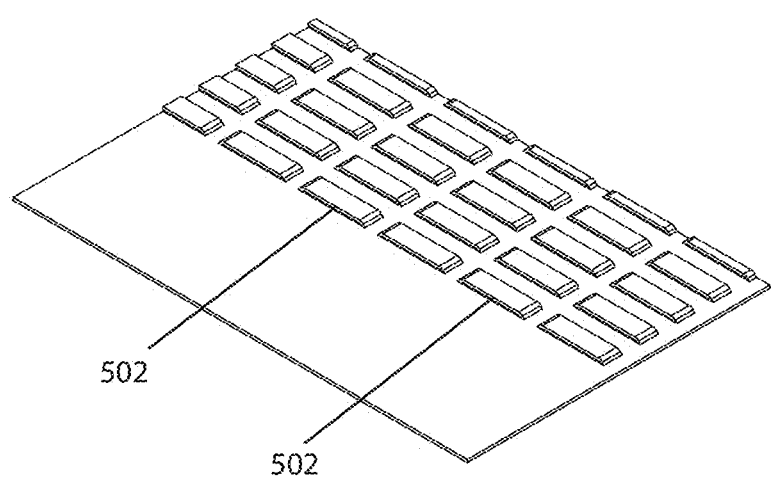
FIG. 5D shows a perspective view of a perforated steel sheet double-sided louver embodiment.

FIG. 5D shows a perspective view of a perforated steel sheet double-sided louver embodiment. Shown are double-sided louvers 502. The double-sided louvers 502 can have a trapezoidal shape with two openings.

FIG. 6 shows a perspective view of a cell stack 600. Shown are separators 601, electrode plates 602, bands 603, and conductive tabs 604.

FIG. 7A shows a cross-section view of a cell stack. Shown are separators 601, negative electrode plates 605, positive electrode plates 606, and bands 603.

FIG. 7B shows a cross-section-view of a z-fold separator. Shown are negative electrode plates 605, positive electrode plates 606, and z-fold separator 701.

FIG. 8 shows an alternate cell stack embodiment 800. Shown are polymer frame 803, electrode plates 602, bands 603, and conductive tabs 604.

FIG. 9A shows a cross-section view of an alternate cell stack embodiment. Shown are polymer frame 803, negative electrode plates 605, positive electrode plates 606, and bands 603.

FIG. 9B shows a cross-section-view of an alternate z-fold separator embodiment. Shown are negative electrode plates 605, positive electrode plates 606, and polymer frame 803.

Figure 10A:
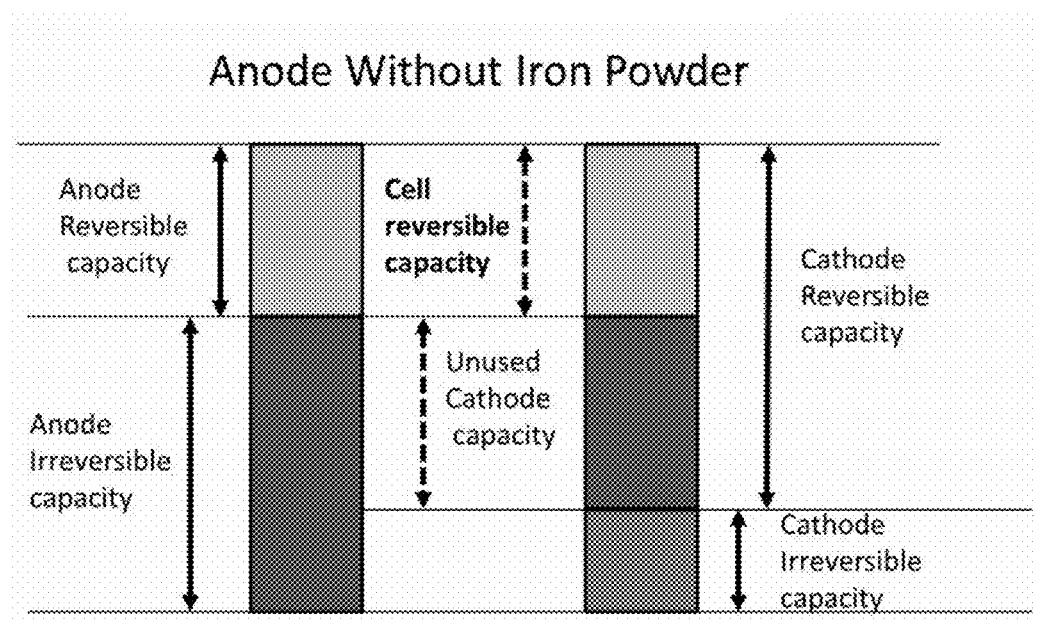
FIG. 10A shows anode performance without an iron powder precharge.

FIG. 10A shows anode performance without an iron powder precharge.

Figure 10B:
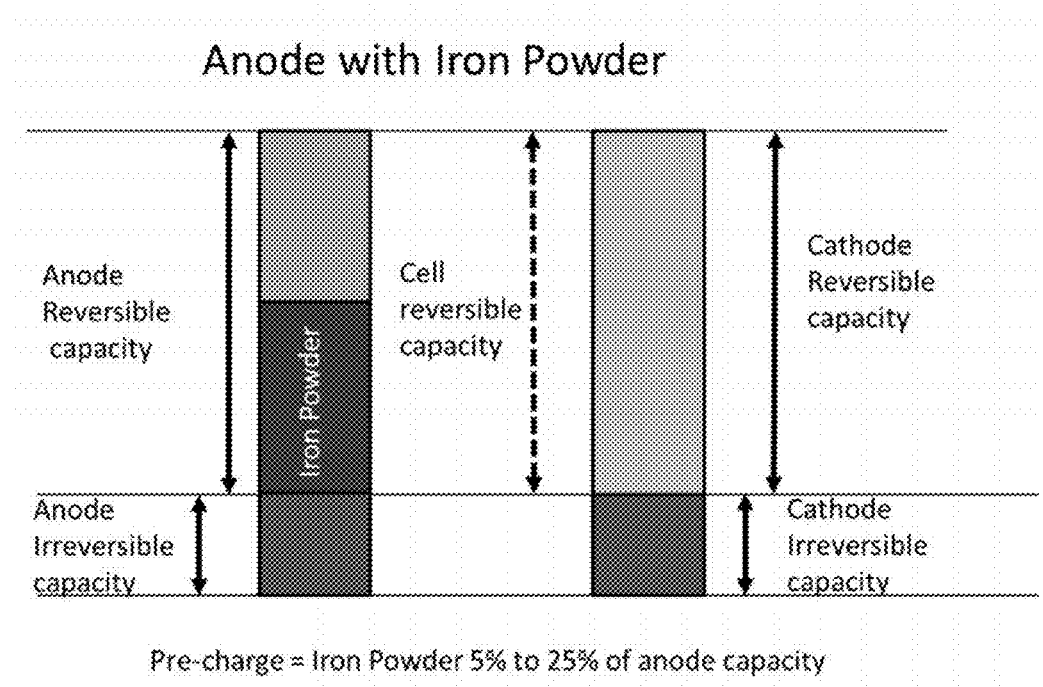
FIG. 10B shows anode performance with an iron powder precharge.

FIG. 10B shows anode performance with an iron powder precharge.

FIG. 11 shows a comparison of nickel iron cell performance both with and without iron powder added.

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

We claim:

1. A nickel-iron battery, the battery comprising:
   a housing, wherein an electrolyte is disposed in the housing and the housing has partitions that divide the housing into one or more cells, wherein at least two of the cells are connected using an intercell connection, wherein each cell comprises:
   a plurality of positive electrode plates, wherein:
      each positive electrode plate comprises a multi-cavity current collector,
      wherein each positive electrode current collector:
         encases one or more positive electrode pellets; and
         includes perforations in the shape of double-sided louvers protruding outwardly in a uniform direction from a single surface of the positive electrode current collector, wherein each double-sided louver comprises a first opening in a first direction and a second opening in a second direction;
   a plurality of negative electrode plates, wherein:
      each negative electrode plate comprises a multi-cavity current collector,
      wherein each negative electrode current collector:
         encases one or more negative electrode pellets; and
         includes perforations in the shape of double-sided louvers protruding outwardly in a uniform direction from a single surface of the positive electrode current collector, wherein each double-sided louver comprises a first opening in a first direction and a second opening in a second direction;
   a separator disposed between at least one of the positive electrode plates and at least one of the negative electrode plates; and
   at least one band configured to contain the cell in a unified assembly.

2. The battery of claim 1, wherein the negative electrode pellets comprise an iron oxide anode consisting of iron powder between 5 and 50 percent by weight.

3. The battery of claim 1, wherein the negative electrode pellets comprise an iron oxide anode consisting of iron powder between 10 and 20 percent by weight.

4. The battery of claim 1, further comprising a positive extension tab and a negative extension tab, wherein the positive extension tab is connected to a positive current collector tab at least partially encased by the positive electrode current collector and the negative extension tab is connected to a negative current collector tab at least partially encased by the negative electrode current collector.

5. The battery of claim 4, wherein the intercell connections are achieved using a compressed plastic grommet to seal between extension tabs and an intercell partition that exists between adjacent cells.

6. The battery of claim 4, wherein the positive extension tab has a prescribed protrusion that has a cylindrical portion enclosed by a spherically radial portion, wherein an outside diameter of the cylindrical portion is between 2 and 30 mm and the length of said cylindrical portion is between 100 and 300% of a thickness of the intercell partition.

7. The battery of claim 5, wherein the compressed grommet seal is achieved by forming a positive extension tab protrusion of the positive extension tab into a formed head, wherein the diameter of the head is between 105 and 200% of the cylindrical portion outside diameter.

8. The battery of claim 1, wherein each positive electrode plate current collector's perforations are between 20 to 200 microns tall and 0.1 to 4.0 mm wide.

9. The battery of claim 1, wherein the perforations of the double-sided louver of the positive electrode plate current collector are between 20 to 200 microns tall and 0.1 to 4.0 mm wide.

10. The battery of claim 1, wherein each positive electrode current collector has an open area between 2 and 20%.

11. The battery of claim 1, wherein each positive electrode current collector has unperforated areas.

12. The battery of claim 1, wherein each positive electrode current collector has continuous perforations.

13. The battery of claim 1, wherein each negative electrode plate current collector's perforations are between 20 to 200 microns tall and 0.10 to 4.0 mm wide.

14. The battery of claim 1, wherein the perforations of the double-sided louver of the negative electrode plate current collector are between 20 to 200 microns tall and 0.1 to 4.0 mm wide.

15. The battery of claim 1, wherein each negative electrode current collector has an open area between 2 and 20%.

16. The battery of claim 1, wherein each negative electrode current collector has unperforated areas.

17. The battery of claim 1, wherein each negative electrode current collector has continuous perforations.

* * * * *